United States Patent [19]
Zajchowski et al.

[11] Patent Number: 5,998,755
[45] Date of Patent: Dec. 7, 1999

[54] TOOLING ASSEMBLY FOR POSITIONING AIRFOILS OF A ROTARY MACHINE

[75] Inventors: Paul H. Zajchowski, Enfield; Alfonso Diaz, Vernon, both of Conn.

[73] Assignee: United Technologies Corporation, Hartford, Conn.

[21] Appl. No.: 08/994,680

[22] Filed: Dec. 19, 1997

[51] Int. Cl.[6] .................................................. B23K 10/00
[52] U.S. Cl. ........................... 219/76.16; 219/121.47; 219/121.58; 219/121.48; 118/730; 118/500
[58] Field of Search ........................... 219/121.47, 76.15, 219/76.16, 121.58, 121.48; 118/720, 730, 715, 425, 423, 34, 295, 500

[56] References Cited

U.S. PATENT DOCUMENTS

| | | | |
|---|---|---|---|
| 4,082,870 | 4/1978 | Yenni | 427/425 |
| 4,596,718 | 6/1986 | Gruner | 427/34 |
| 5,520,516 | 5/1996 | Taylor et al. | 416/241 B |
| 5,702,574 | 12/1997 | Foster et al. | 204/224 R |

*Primary Examiner*—Mark Paschall
*Attorney, Agent, or Firm*—Gene D. Fleischhauer

[57] ABSTRACT

A tooling assembly 10 for use with apparatuses 12,54 for propelling a stream of particles at the tip 46 of a rotor blade, a stator vane is disclosed. Various construction details are developed which enable the use of the assembly with either apparatus. In one embodiment, the wall 36 of a rotatable fixture 32 shields part of the rotor blade or stator vane.

11 Claims, 3 Drawing Sheets

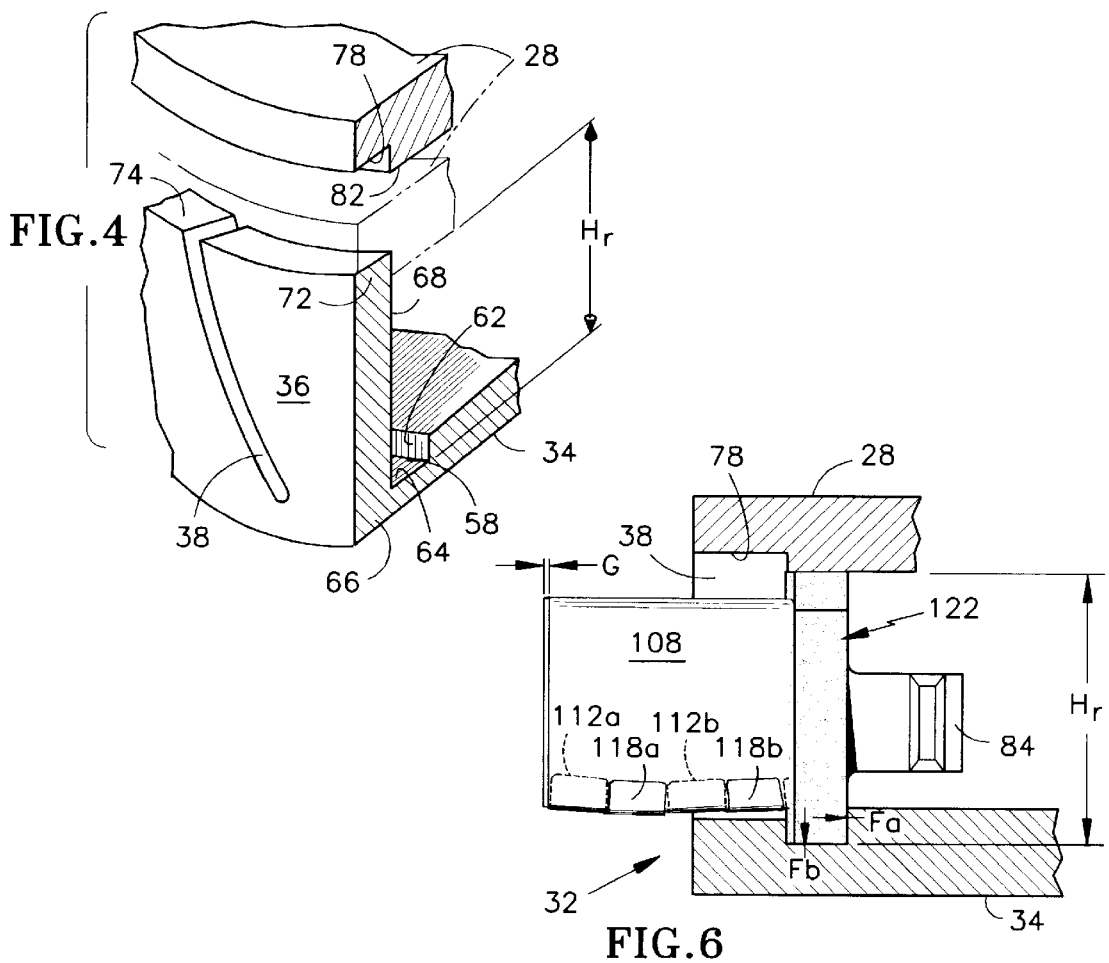
FIG. 4
FIG. 6
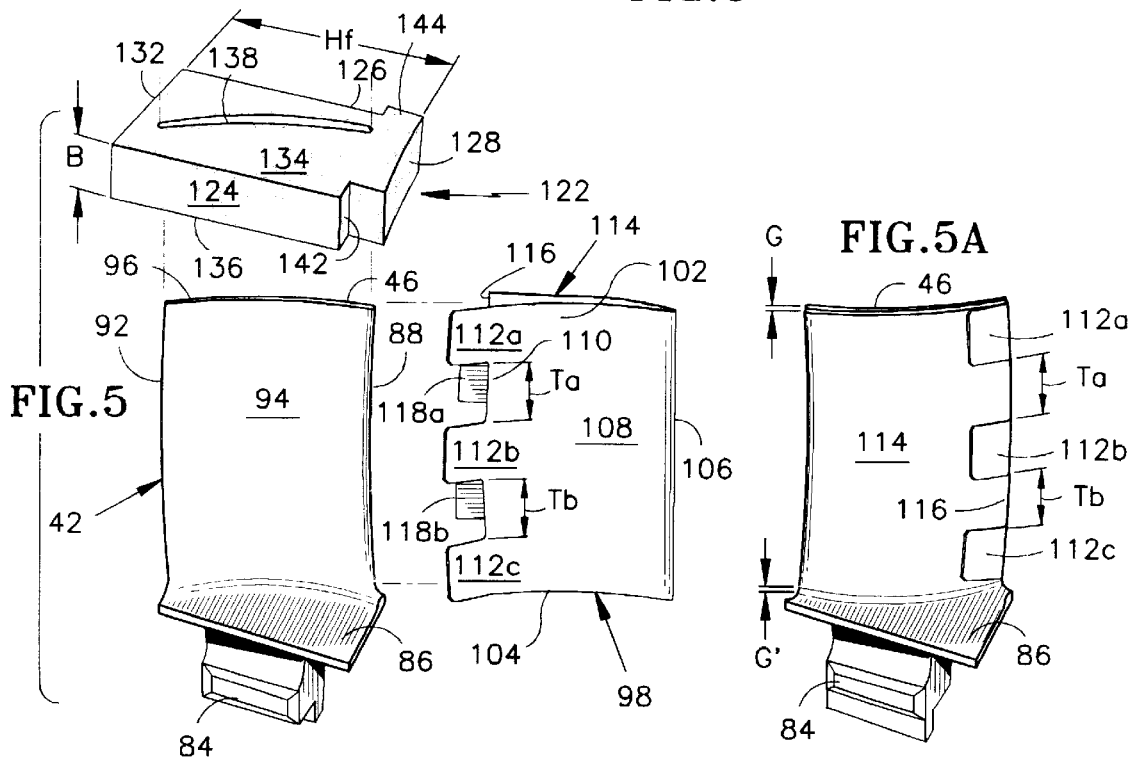
FIG. 5
FIG. 5A

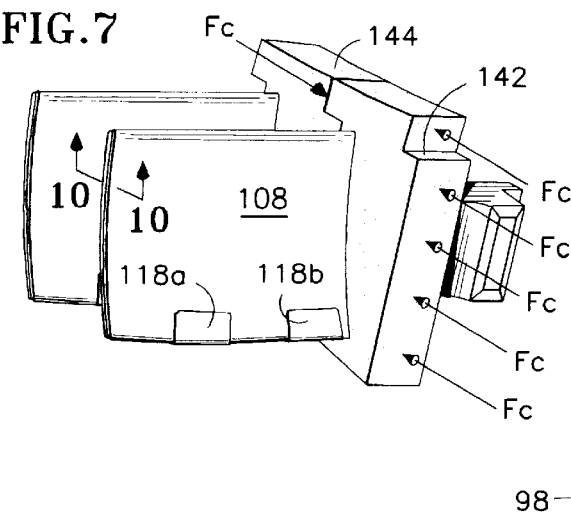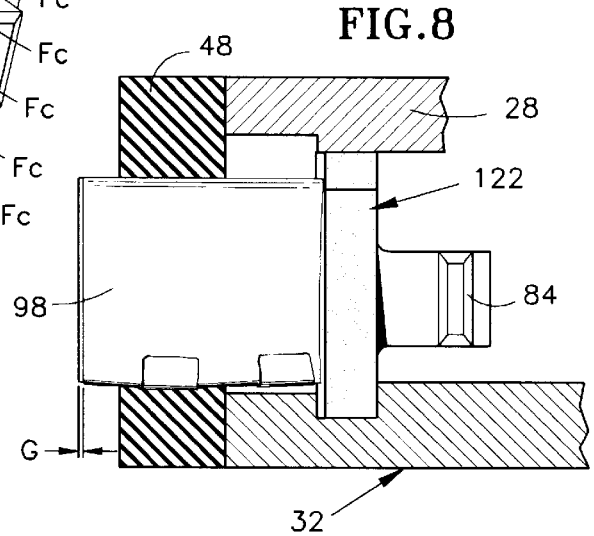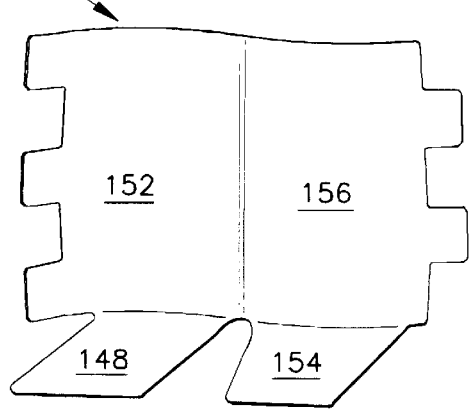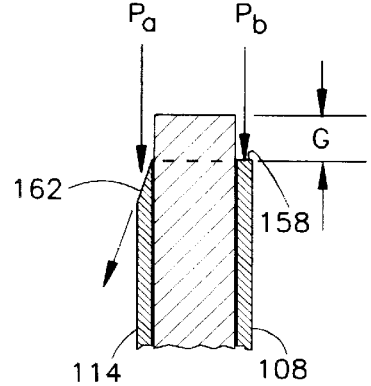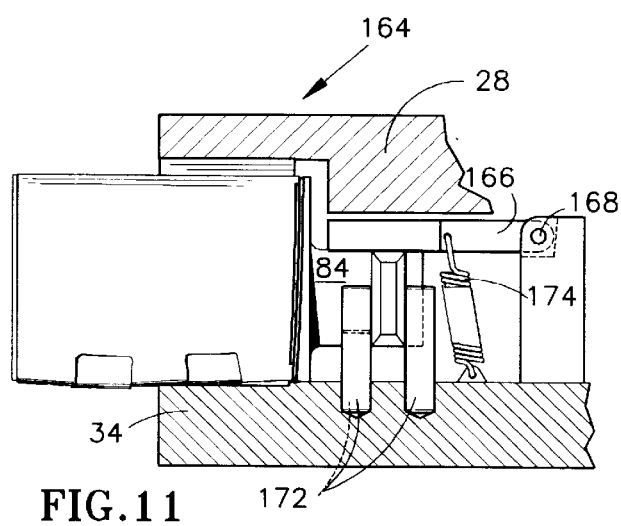

TOOLING ASSEMBLY FOR POSITIONING AIRFOILS OF A ROTARY MACHINE

CROSS REFERENCE TO RELATED APPLICATIONS

This application relates to the following copending U.S. applications filed on even date herewith and commonly assigned to the assignee of the subject application: U.S. application Ser. No. (EH-10118), entitled METHOD FOR APPLYING A COATING TO THE TIP OF A FLOW DIRECTING ASSEMBLY, by Zajchowski et alia, and U.S. application Ser. No. (EH-10117), entitled SHIELD AND METHOD FOR PROTECTING AN AIRFOIL SURFACE, by; Zajchowski et alia and U.S. application (eh-10096), Ser. No. 08/994,660, filed Dec. 19,1997, entitled "THERMAL SPRAY COATING PROCESS FOR ROTOR BLADE TIPS," by Zajchowski et alia now U.S. Pat. No. 5,879,753.

TECHNICAL FIELD

This invention relates to a fixture for positioning the tips of a plurality of airfoils with respect to an apparatus for propelling particles toward the tips of such airfoils.

BACKGROUND OF THE INVENTION

An axial flow rotary machine, such as a gas turbine engine for an aircraft, has a compression section, a combustion section and a turbine section. An annular flow path for working medium gases extends axially through the sections of the engine. A rotor assembly extends axially through the engine. The rotor assembly includes a plurality of rotor blades which extend outwardly across the working medium flow path in the compression section and the turbine section. A stator assembly includes an outer case which extends circumferentially about the flow path to bound the working medium flow path. The stator assembly has arrays of stator vanes which extend radially inwardly across the working medium flow path between the arrays of rotor blades in both the compression section and turbine section.

The rotor blades and stator vanes are flow directing assemblies. Each has an airfoil which is designed to receive, interact with and discharge the working medium gases as the gases are flowed through the engine. Airfoils in the turbine section receive energy from the working medium gases and drive the rotor assembly at high speeds about an axis of rotation. Airfoils in the compression section transfer energy to the working medium gases to compress the gases as the airfoils are driven about the axis of rotation by the rotor assembly.

The airfoils in both sections extend radially across the working medium flow path. The airfoils extend into close proximity with the adjacent stator structure to block the leakage of the working medium gases around the tips of the rotor blades. As a result, the tips of such airfoils may rub against such structure during transient operation. Alternatively, the tips are designed to cut a groove or channel in such structure. The blades extend into the channel during steady state operation to decrease tip leakage.

The tips of such airfoils are often provided with an abrasive material and are axially aligned with adjacent radial structure which is provided with an abradable material. The combination of an abrasive tip with abradable material spaced radially from the tip enables the structure to accommodate movement of the blades outwardly and to accommodate interference between the tips of the blade and the adjacent structure. This occurs without destruction of the tip of the tip or the stator structure and enables the tip to cut the necessary groove if so required.

The abrasive material may be provided to a substrate at the airfoil tip by many techniques such as powder metallurgy techniques, plasma spray techniques, and electroplating techniques. One example of a plasma spraying device is shown in U.S. Pat. No. 3,145,287 to Siebein et al. entitled: "Plasma Flame Generator and Spray Gun". In Siebein, a plasma forming gas is disposed about an electric arc and passed through a nozzle. The gas is converted to a plasma state and leaves the arc and nozzle as a hot free plasma stream. Powders are injected into the hot free plasma stream and heated. The softened powder is propelled onto the surface of a substrate which receives the coating. Other examples of such devices are shown in U.S. Pat. No. 3,851,140 to Coucher entitled "Plasma Spray Gun and Method for Applying Coatings on a Substrate" and U.S. Pat. No. 3,914,573 to Muehlberger entitled "Coating Heat Softened Particles by Projection in a Plasma Stream of Mach 1 to Mach 3 Velocity".

The substrate is typically prepared for receiving the particles by cleaning and roughening the surface of the substrate. One technique uses a grit blasting apparatus to propel abrasive particles against the substrate by grit blasting. Portions of the airfoil are masked or shielded with a mask or shield to prevent the abrasive particles from damaging the airfoil and other portions of the blade. Performing this operation in production quantities requires a fixture for each blade to support the tip of the blade during the grit blasting operation and a fixture for supporting the tip of the blade during the coating of the tip of the airfoil.

The coating process takes place at temperatures which are much higher than the temperature at which the grit blasting operation takes place. The blade may be removed from the fixture used for grit blasting after completing preparation of the surface of the coating. Any shields or masks that cannot survive at high temperatures are then removed. The blade is reinstalled in the fixture or moved to a new fixture. Moving the blade to a new fixture or removal of the blade from the fixture and reinstallation increases handling time of the process and may result in damage to the blade.

It is preferable to use a shield, for example, for the airfoil surface adjacent the tip which may survive both impact of abrasive particles and high temperatures of the plasma spray process. Metal shields extending over several airfoils have been used with a screw fastener for the shield. A metal band having a tab is installed near the tip between the shield and the airfoil to fill the gap between the relatively rigid shield and the airfoil.

Another approach is to use a high temperature material, such as aluminum foil tape, which is suitable for use during the plasma spray process to provide the masking or shielding. The aluminum tape is also suitable for use during the grit blasting operation. The aluminum tape has an adhesive backing which is used to affix the tape to the airfoil. The tape requires precise installation to maintain the correct clearance between the top of the rotor blade and aluminum tape which acts as a mask or shield. If an error occurs in installation, the tape is removed with difficulty because of the adhesive and new tape installed.

The aluminum tape remains in place for both the grit blasting and plasma coating operation. After removal from the grit blasting fixture, the rotor blade is reinstalled in the coating fixture. After receiving the plasma spray coating, the tape and its adhesive are removed, often with difficulty because the adhesive is an integral part of the tape and because it leaves a residue even after the tape is removed. The tape is expensive, labor intensive to apply, labor intensive to remove, and is not reusable.

Accordingly, the above are notwithstanding, scientists and engineers working under the direction of applicants assignee have sought to improve the shields used during the application of coatings to the tips of rotor blades.

SUMMARY OF INVENTION

This invention is in part predicated on the recognition that a rotatable fixture having a wall to shield part of the rotor blade or stator vane may be used with apparatuses for propelling abrasive particles against an airfoil tip or applying plasma spray coatings to the tip at a temperature which is elevated with respect to the abrasive process.

According to the present invention, a tooling assembly for a rotor blade or stator vane of a rotary machine has a fixture which extends circumferentially about an axis of rotation, the fixture having a plurality of circumferentially spaced slots through which an airfoil extends at each slot to position the tip of the airfoil in an outward direction and to shield portions of the rotor blade or stator vane with the fixture.

In accordance with the present invention, the tooling assembly includes means for engaging the rotor blade or stator vane inwardly of the slot to fix the blade within the fixture such that the airfoil tips face in a radially outward direction.

In accordance with one embodiment of the present invention, the means for engaging the rotor blade or stator vane is an elastic block which is disposed about the airfoil and trapped within the fixture.

In accordance with another detailed embodiment, the means for engaging the rotor blade or stator vane is a spring loaded clamp.

A primary feature of the present invention is a tooling assembly having a fixture rotatable about an axis of rotation. Another feature is a wall of the fixture having a plurality of circumferentially spaced slots. Still another feature is an elastic block which is disposed about the airfoil inwardly of the slot. In one embodiment, the block is compressed in the installed condition. Another feature is a shield having a first side and a second side which conform closely to the suction side wall and compression side wall of the airfoil. In one embodiment, a plurality of interdigitated tabs extend from one side of the shield into faying relationship with the other side of the shield. In one detailed embodiment, a feature is a circumferentially extending elastomeric shield having a plurality of slots, the shield being disposed circumferentially about the fixture such that each slot is in radial alignment with an associated slot in the fixture and receives the airfoil of an associated rotor blade or stator vane.

A primary advantage of the present invention is the speed at which an array of rotor blades or stator vanes may be shielded and fixtured for a coating process and for surface preparation such as by abrasive blasting. Another advantage is the speed and economy which results from using a single fixture for surface preparation and for the coating process. Another advantage is the decreased cost of the surface preparation and coating processes which results from the durability of reusable shields as compared with those constructions which require destructive use of such shields. Another advantage is the quality of the tip coating and the surface finish of the tip after abrasive cleaning of the airfoil which results from rotating the fixture to distribute among a multiplicity of the airfoil tips any variations in flow parameters affecting the stream of particles propelled against the tip. Still another advantage is the quality of the resulting coating which results from the removability of the shielding without chipping or scratching of the applied coating.

The foregoing features and advantages of the present invention will become more apparent in light of the following detailed description of the best mode for carrying out the invention and accompanying drawings.

BRIEF DESCRIPTION OF THE DRAWINGS

FIG. 4 is a partial perspective view in exploded fashion of a portion of a fixture of the tooling assembly shown in FIG. 1 and FIG. 3 showing the relationship of a wall of the fixture to a ring member which engages the wall, the wall having a plurality of slots.

FIG. 5 is a perspective; exploded view showing the relationship of a rotor blade, an elastic block having a slot that adapts the block to engage the airfoil of the rotor blade and a metal shield having sides which are adapted to be disposed over the airfoil of a rotor blade.

FIG. 5A is a view corresponding to the perspective view shown in FIG. 5 showing the opposite side of the rotor blade with the metal shield installed.

FIG. 6 is a cross sectional view taken along the lines 6—6 of FIG. 1 showing the relationship of the fixture of the rotor blade, elastic block and metal shield shown in FIG. 5.

FIG. 7 is a view of two adjacent rotor blades with the fixture broken away for clarity, each having a shield and block installed, the blocks extending into an abutting relationship.

FIG. 8 is a cross-sectional view taken along the lines 8—8 of FIG. 3 showing the relationship of the fixture of the rotor blade, elastic block and metal shield shown in FIG. 3 to the elastomeric shield shown in FIG. 2 in the installed condition.

FIG. 9 is a view of an alternate embodiment of the shield shown in FIG. 5, the shield having platform guards for the rotor blade, the guards each extending from a side of the metal shield.

FIG. 10 is a view taken along the line 10—10 of FIG. 7 showing the tip of an airfoil and a metal shield, the shield having a flat edge on the first side of the shield and having a beveled edge on the second side of the metal shield and showing the paths Pa and Pb of two metal particles or two powder particles.

FIG. 11 is a view of an alternate embodiment of a means for positioning a rotor blade in the fixture shown in FIG. 1 and the shield shown in FIG. 9.

BEST MODE FOR CARRYING OUT THE INVENTION

Figure 1:
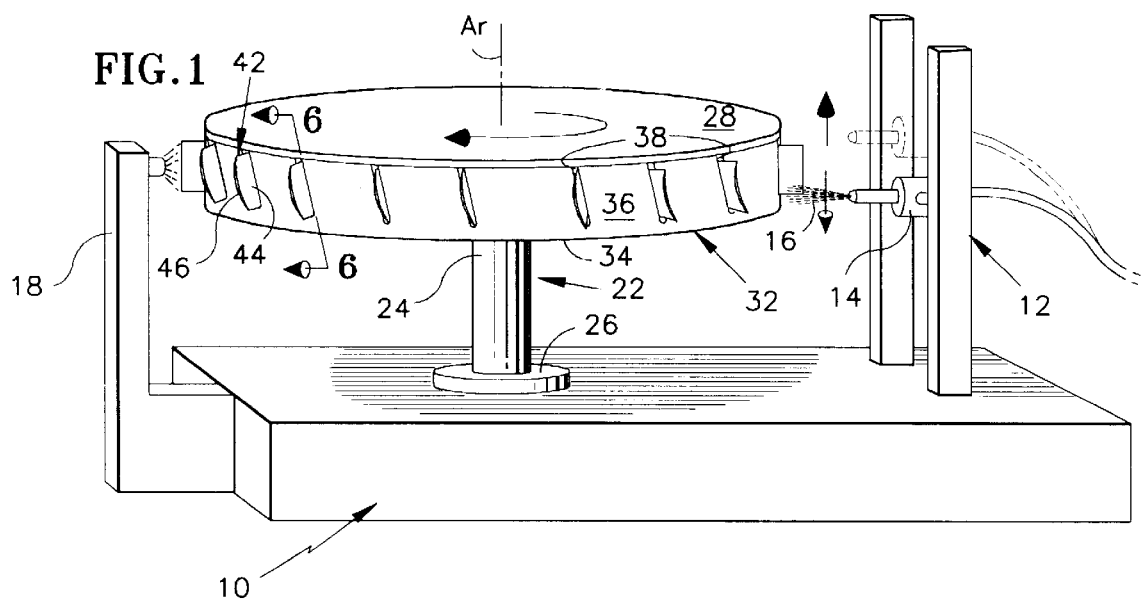
FIG. 1 is a perspective view in schematic fashion showing a tooling assembly of the present invention and apparatus for propelling heated coating particles at the tips of an array of rotor blades disposed in the tooling assembly.

FIG. 1 is a perspective, schematic view of a tooling assembly 10 and an apparatus, as represented by a spray coating apparatus 12, for propelling a stream of particles in a predetermined direction. The spray coating apparatus includes a gun 14 which is translatable in the vertical direction with respect to the tooling assembly. The spray coating apparatus forms a heated plasma 16 containing heated particles, such as softened zirconia oxide particles, which are propelled in the heated plasma toward the tooling assembly. Means for adding heat to the tooling assembly or removing heat from the tooling assembly, as a represented by the gas apparatus 18, is in a flow communication with the tooling assembly.

The tooling assembly 10 for use with the spray coating apparatus 12 is in close proximity to the apparatus. The tooling assembly has an axis of rotation Ar. Means for driving the tooling assembly 22 rotatably about the axis of rotation Ar includes a rotatable pedestal 24 which is attached to the tooling assembly. A housing has a bearing assembly 26 for rotatably supporting the pedestal. Means for rotatably driving the pedestal about the axis of rotation (not shown) are disposed within the housing. Such means might include a belt drive or a gear for driving the pedestal about its axis of rotation.

The tooling assembly 10 includes a ring member 28 and a fixture 32 which extend circumferentially about the axis of rotation Ar. The ring member and fixture are formed of a suitable alloy, such as MES 190 stainless steel. The fixture has a base 34 extending circumferentially and radially outwardly with respect to the axis of rotation. A wall 36 extends in a generally axial direction from the base and circumferentially about the fixture. The wall has a plurality of slots, as represented by the slots 38, extending through the wall in a generally radial direction A plurality of rotor blades 42 are disposed in the fixture. Each rotor blade has an airfoil 44 extending outwardly from the fixture. Each slot 38 adapts the fixture 32 to receive an airfoil of a rotor blade. The airfoil terminates in an airfoil tip 46 which faces in the outward direction from the tooling assembly.

Figure 2:
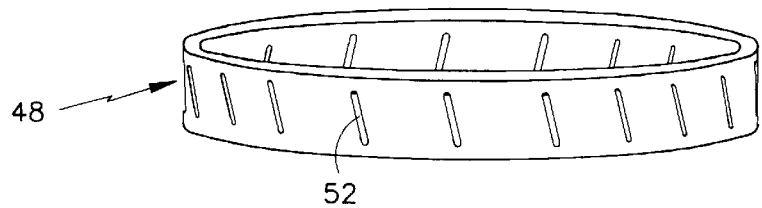
FIG. 2 is a partial perspective view of an elastomeric shield for shielding the face of the fixture.

FIG. 2 is a perspective view of an elastomeric mask 48 for the fixture 32. The elastomeric mask may assume a cylindrical shape in the installed condition. The elastomeric mask has a plurality of slots 52 extending through the mask in a generally radial direction. Each slot adapts the mask to receive the airfoil 44 of the associated rotor blade 46 which extends outwardly through the mask.

Figure 3:
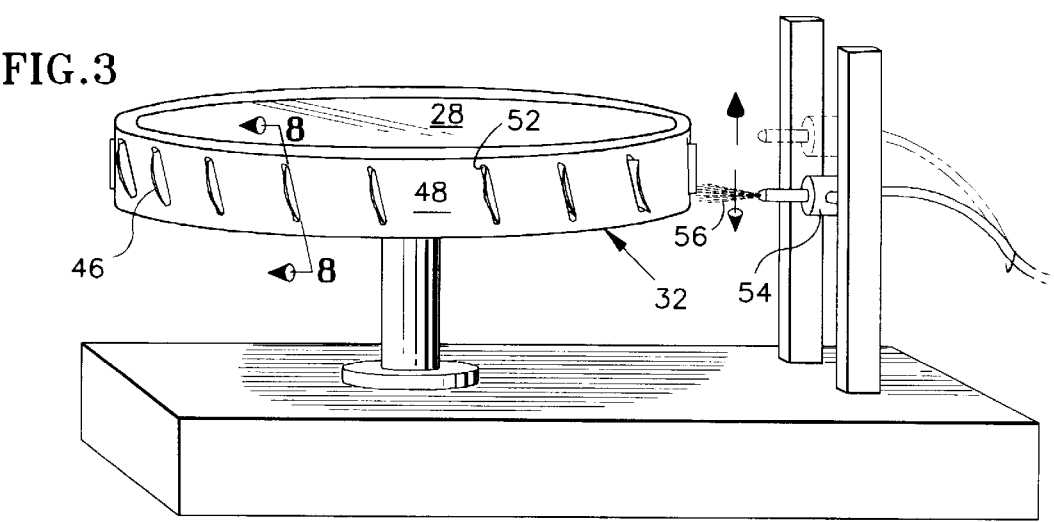
FIG. 3 is a partial perspective view of the tooling assembly shown in FIG. 1 with an elastomeric shield installed over the fixture and an apparatus for propelling abrasive particles at the tips of an array of rotor blades disposed in the fixture.

FIG. 3 is a view corresponding to the view shown in FIG. 1 showing an abrasive (grit) blasting apparatus 54 and the elastomeric mask 48 shown in FIG. 2 in the installed condition. The apparatus propels abrasive particles 56 toward the tips 46 of the rotor blades 42 disposed in the fixture 32. As shown, the elastomeric mask extends circumferentially about the exterior of the fixture. Each slot 52 of the elastomeric shield is aligned with an associated slot 38 in the fixture (not shown). Each slot adapts the elastomeric shield to receive the airfoil of the rotor blade at that slot such that the tip 46 of the airfoil is exposed at a location radially outwardly of the wall 36.

FIG. 4 is a partial perspective view of the fixture 32 shown in FIG. 1 showing in exploded fashion the relationship of the base 34 and the wall 36 to the ring member 28. The base has a groove 58 which extends circumferentially about the base. The base has an axially facing first surface 62 which extends radially to bound the groove. A radially outwardly facing second surface 64 extends axially to bound the groove in the axial direction.

The wall 36 of the fixture 32 has a first end 66 which is attached to the base. The wall has a first surface 68 facing radially inwardly which extends axially and bounds the groove 58 over a portion of the surface 68. The wall has a second end 72 having a second surface 74 which faces in a generally axial direction and which extends circumferentially about the wall. The plurality of slots 38 extend through the wall and to the second surface 74 of the wall.

The ring member 28 has a lip 76 which has a radial facing surface 78 which locates the ring member on the wall by engaging the second surface 74 of the wall. The ring member has a second surface 82 which faces axially and is spaced axially a distance Hr from the second surface 64 of the groove in the installed condition as shown by the dimension line extending up to the phantom line representation of the ring member.

FIG. 5 is a perspective view of one of the plurality of rotor blades 42 shown in the fixture in FIG. 1 and in FIG. 3. The rotor blade has a root 84 and a platform 86. The airfoil 44 extends from the platform. Each airfoil has a leading edge 88 and a trailing edge 92. A suction surface 94 and a pressure surface 96 extend between the edges.

Each rotor blade in the fixture has a metal shield which is adapted to be disposed about the airfoil as represented by the uninstalled shield 98. The metal shield is formed of a suitable metal which can withstand the impact of abrasive particles and the temperature of the plasma spray process. One suitable material is stainless steel having a thickness of ten thousandths to fifty thousandths of an inch (0.010–0.050 inches).

The shield 98 has a first end 102 and a second end 104 which is in close proximity to the platform 86. A front edge 106 extends spanwise between the second end and the first end. A first side 108 extends from the front edge. The first side has a rear edge 110 spaced chordwise from the front edge. A first tab 112a extends from the rear edge at the first end. A second tab 112b extends from rear edge and is spaced spanwise from the first tab leaving a gap Ta therebetween. A third tab 112c extends from the rear edge at the second end. The third tab is spaced spanwise from the second tab leaving a gap Tb therebetween.

The metal shield has a second side 114 extending chordwise from the front edge 106. The second side has a rear edge 116 spaced spanwise from the front edge 106 and adjacent to the rear edge 110 of the first side 108. A first tab 118a extends from the rear edge at a spanwise location aligned with the gap Ta. A second tab 118b extends from the rear edge and is lined with the gap Tb.

A plurality of blocks of elastic material, as represented by the block 122, are each disposed at an associated rotor blade 42. The block is formed of a material resistant to the impact of abrasive or metal particles and to the temperature of the plasma spray process. One suitable material is A-9666 material available from the Airex Rubber Product Corporation, 100 Indian Hill Avenue, Portland, Conn.

The block has a first side 124 and a second side 126. A first surface 128 and a second surface 132 extend between the sides and are spaced by a height Hf in the uninstalled condition. The block has a first face 134 and a second face 136 which are spaced spanwise by the thickness B of the block. The block has a slot 138 which extends from the first face 134 to the second face 136. The slot has a profile which adapts the block to receive the cross-sectional shape of the airfoil and the shield in the installed condition.

FIG. 5A is a view corresponding to the perspective view shown in FIG. 5 showing the opposite side of the rotor blade with the metal shield installed. The tabs of the shield 98 overlap the sides of the shield in interdigitated fashion. For example, the first and second tabs 118a, 118b of the second side 114 extend over the first side 108 and are in faying contact with the first side of the shield. In a similar fashion, the first, second and third tabs 112a, 112b, 112c of the first side extend over the second side 126 and are in faying contact with the second side.

FIG. 6 is a cross-sectional view of the fixture 32 shown in FIG. 4 taken along the line 6—6 of FIG. 1. The fixture is shown with the rotor blade 42, the shield 98 and the block 122 shown in FIG. 5 and FIG. 5A in the installed condition. The block is disposed between the platform 86 of the rotor blade and the wall 32 of the fixture. The shield is disposed about the airfoil 44 between the block and the airfoil. The shield extends substantially the entire spanwise length of the airfoil. In the installed condition, the first end 102 of the metal shield is spaced less than a predetermined spanwise distance G from the tip. The second end 104 is spaced less than a predetermined spanwise distance G' from the platform. The distance G' is less than the spanwise thickness B of the block. The thickness of the block B overlaps the gap G' between the platform and the end of the shield.

The block 122 of elastic material abuts the shield 98 and exerts a compressive force on the shield. The compressive force resists spanwise movement of the shield with respect to the airfoil 44 in the uninstalled condition of the rotor blade. This aids in maintaining the gap G and the gap G' at its predetermined amount. It also resists movement in the installed condition. The block is compressed axially from its uninstalled height Hf to its installed height Hr by the ring member 28 and base 34 to increase the compressive forces on the shield and to hold the block within the fixture. The block is constrained against movement by the groove as the block is compressed. The installed height of the block is equal to the Hr of the ring member from the base as measured at the block.

FIG. 7 shows the relationship of adjacent blocks 122 in the installed condition in the fixture. As the block is compressed, the block exerts a circumferential force Fc against the sides of the adjacent blocks and axial forces Fa, and radial forces Fb, Fb as shown in FIG. 6 against the surfaces of the base and the wall bounding the groove to fix the plurality of rotor blades in the fixture. In one detailed embodiment, each block is provided with an indented shoulder 142 and a projection 144 which is engaged by the adjacent block to aid in locking the blocks together as the blocks are compressed.

FIG. 8 is a cross-sectional view of the fixture 32 shown in FIG. 4 taken along the lines 8—8 of FIG. 3. The fixture is shown in relation to the elastomeric shield 48 or mask which extends circumferentially about the fixture. The elastomeric shield protects the wall 36 of the fixture and the ring member 28 during surface preparation using abrasive material.

FIG. 9 is a view of an alternate embodiment 146 of the shield shown in FIG. 5 with the shield flattened to show both sides. In this embodiment, the shield has a first platform guard 148 which extends circumferentially from the first side 152 of the shield. A second platform guard 154 extends circumferentially from the second side 156. The shield blocks particles from contacting the platform in those embodiments in which the shield is used to protect the platform rather than a block 122 disposed between the platform and the wall.

FIG. 10 is a view taken along the line 10—10 of FIG. 7. FIG. 10 shows the tip 46 of the rotor blade 42 and the first side 108 and the second side 114 of the shield. The first side has a flat surface 158 facing radially outwardly and the second side is chamfered to form a beveled surface 162.

The first side 108 and the second side 114 of the shield conform to the pressure surface 96 and the suction surface 94 of the airfoil and are spaced slightly from the surfaces. In other embodiments, the sides of the shield are in abutting contact with the surfaces of the airfoil at the tip or partially spaced and partially in contact.

FIG. 11 is an alternate embodiment 164 of the fixture 32 shown in FIG. 6. FIG. 6 employs a spring loaded clamp 166 to engage the platform of the rotor blade. The clamp has a first jaw which is hinged about a pivot 168. The jaw is urged against locating pins 172 by a spring 174 which extends to the jaw and urges the jaw downwardly engage the platform of the rotor blade.

In FIG. 11, the installed metal shield 146 is the embodiment shown in FIG. 9. The platform guards 148,154 of the shield extend circumferentially about the fixture for a distance in the circumferential direction such that the platform guard 148 of the first side 152 overlaps the platform guard 154 on the second side 156 of the adjacent shield.

Prior to operation of the fixtures 32,164 with apparatuses 12,54 for propelling particles that are shown in FIG. 1 and FIG. 3, the airfoil 44 and platform 86 on the rotor blade 42 are protected by masks or shields. The wall may provide part or may provide all of the required protection.

Each rotor blade 42 receives a shield 98 which is slipped over the airfoil. A tab 112a or 118a on one side is pulled with a gripping device, such as a pair of pliers, over the other side and pressed tightly against the side in a faying relationship. The remaining tabs are pulled and bent over to engage the other side of the shield. The shield presses tightly against the rotor blades but is still moveable by exerting a sufficient amount of force on the shield in the spanwise direction to adjust the gap G between the end 102 of the shield and the tip 46 of the rotor blade and the gap G' between the second end 104 of the shield and the platform 86. The tabs extending from the sides of the shield positively urge the rear edges 110, 116 of the shield together along the entire length of the shield by reason of the interdigitated nature of the tabs 112a, 112b, 112c on the first side with the tabs 118a, 118b on the second side. The shield is forced spanwise along the airfoil establishing the correct gap G between the shield and the airfoil tip and the gap G' between the shield and the platform.

The block 122 is installed by sliding the block over the shield 98 into abutting contact with the platform 86. The block extends over the gap $G^1$ between the shield and the platform by reason of its thickness B. The elastic block exerts a compressive force against the shield, compressing the shield against the airfoil to restrain the shield against movement with respect to the airfoil. A significantly higher level of force is required to move the shield along the spanwise length of the airfoil as compared with the amount of force needed to move the shield prior to installation of the elastic block.

During use of the apparatus shown in FIG. 1 and FIG. 3, a plurality of rotor blade assemblies are formed. Each has a rotor blade 42, a shield 98 and a block 122. Each rotor blade assembly is installed in an associated slot 38 in the fixture with the blocks of adjacent rotor blades in abutting contact.

Referring to FIG. 6, as each blade is inserted into the slotted fixture, the free height Hf of the block is slightly greater than the height Hr of the ring 28 from the base 34 as measured at the block. In one embodiment, the height of the block is about one inch and the block is compressed approximately twenty thousandths of an inch. The walls 62,64 of the groove 58 exert a slight compressive force on the block prior to compression. This force holds the rotor blade slightly against movement with respect to the fixture. Adjacent rotor blade assemblies with their associated shields and blocks are then inserted until all slots in the fixture are filled. The circumference of the array of blocks 122 is equal to or slightly larger than the circumference of the groove 58 so that the adjacent blocks press against each other and the groove. As will be realized, satisfactory constructions might result from using an array blocks having a circumference for the array which is equal to or slightly less than the circumference of the groove.

The ring member 28 is installed with the ring member engaging the second surface 74 of the wall. The second surface 82 of the ring member presses against the elastic block 122, compressing the block. This causes the block to exert an increased normal force against the bottom 64 of the groove 58. In some constructions, the block also exerts an increased normal force against the sides of the groove and against the sides of the adjacent blocks. Compressing the block tightly positions the plurality of blade assemblies in the fixture. The blocks resist movement of the blades even if the rotor blades are brushed against objects during handling, exert a restoring force as a blade moves slightly during such contact, and then elastically return the blade to its original position. Fastening means (not shown) may attach the ring member 28 to the base 34. In other embodiments, the weight of the ring member pressing against the blocks disposed on the interior of the fixture fixes the ring member and the blocks in place.

The tooling assembly 10 is attached to the means for rotatably driving the assembly about its axis of rotation. In the embodiment shown, the tooling assembly is attached to a locating pedestal 24 which is bolted to a device for rotating the pedestal, such as a rotary positioner (not shown).

The tooling assembly 10 with its installed array of rotor blades assemblies 42,98,122 is rotated in a horizontal plane adjacent to the apparatus 12,54 for spraying particles at the tips 46 of rotor blades. The tips 46 face in the radially outward direction. In an alternate embodiment, the wall faces in an axial direction, the slots extend in the axial direction and the blade tips face outwardly in the axial direction. The blocks are compressed in the radial direction by a modified ring member having a radially facing second surface.

The apparatus for spraying particles may be the plasma spray coating apparatus 12 shown in FIG. 1. The apparatus in FIG. 1 propels particles of heated metal powder in a stream of hot gases 16 against the tips 46 of the rotor blades. Alternatively as shown in FIG. 3, the apparatus for propelling abrasive particles 54 may propel abrasive particles 56 formed of aluminum oxide such as are used for grit blasting the tips. The particles impact the surface of the tips, removing foreign matter and roughening the tip in preparation for the coating. Thus, the method for applying a spray coating to the tips of an array of rotor blades includes abrading the tips of the rotor blades by rotating the fixture about its axis of rotation Ar. Rotating the fixture passes each blade through the sprayed abrasive medium.

As shown in FIG. 3, an elastomeric shield 48 of the type shown in FIG. 2 is disposed circumferentially about the exterior of the fixture during surface preparation. The slots 32 in the elastomeric shield 48 each receive an airfoil 44. The shield does not cover the outwardly facing surface of the protruding tip 46 of the rotor blade. The shield extends about the airfoil and between the airfoils to shield the surface of the fixture from the abrasive particles propelled at the fixture by the grit blasting apparatus.

During the grit blasting operation, abrasive particles 56 are propelled as a spray in a direction generally perpendicular to the tip of the airfoil and parallel to the first side and the second side of the shield. At the same time, the tooling assembly 10 is driven about its axis of rotation Ar: passing the airfoils 44 through the spray of particles. Any variations in intensity of size and of quantity of abrasive particles is distributed over the rotor blade tips 46 as the tips are passed through the spray of abrasive particles. This distributes such variations over a number of blade tips rather than on a single blade tip as would occur in a stationary fixture. This results in a more uniform cleaning and roughening action than if the particles were directed in a continuous stream at a single rotor blade tip until the tip was finished.

The particles bounce harmlessly off the elastomeric band shield 48 which extends circumferentially about the exterior of the fixture, protecting the wall 36 of the fixture against roughening. The smooth surface of the wall that is preserved by the elastomeric band shield 48 is helpful during the coating process because it reduces the ability of the coating to stick to the wall during the coating operation. The metal shield 48 protrudes only a slight amount beyond the elastomeric band shield so that substantially the whole metal shield is protected against the abrasive grit.

The abrasive grit 56 is propelled in a direction which is parallel to the metal shield so even if the grit does strike the outermost portion of the shield, only a slight roughening action is experienced by the shield. Again, if variations in angle of the spray occur due to operational tolerances, the abrasive directed at the less than a parallel angle is spread over all of the shields that pass through the spray during the variation ensuring that one shield does not receive all the misdirected abrasive particles. In one embodiment, the shield is beveled on the side 114. Particles strike the surface with a glancing blow, further reducing any roughening action the particles might have on the metal shield.

After completion of the grit blasting operation, the fixture 32 is detached from the locating pedestal base and the same fixture is moved to a new rotary positioner such as the positioned shown in FIG. 1 adjacent to the plasma spray coating apparatus. The rotor blades are still disposed in the same fixture 32 as was used for the grit blasting operation. The rotor blades have not been disturbed by any additional handling and are wrapped by the elastomeric shield. The elastomeric shield is formed of a material having a lower melting temperature than the temperature of the plasma spray. Accordingly, the elastomeric shield is removed from the fixture prior to the spray coating operation.

During operation of the spray coating apparatus shown in FIG. 1, a stream of heated particles of powder and hot gases 16 are propelled toward the tooling assembly 10. The rotor blades 42, disposed in the rotatable fixture of the tooling assembly, are oriented with the tips 46 facing outwardly as in the grit blasting operation.

As the fixture 32 is rotated about its axis of rotation Ar, the tips 46 are passed through the coating spray. Layers of coating are deposited on each rotor blade sequentially with each pass of a blade tip through the coating spray. Each layer is cooled slightly as the blade leaves the hot plasma spray 14. In alternate embodiments, the tips 46 may pass through a source of heat, such as the heating gun 18 which forms a spray of hot gases. Alternatively, the tips may pass through a source of cooling, such as a device which is similar to the heating gun, but which sprays cool air on the tips or on the fixture. Cooling the fixture enables the fixture to use elastomeric or elastic materials which otherwise might be damaged by the heat.

As with the grit blasting operation, any variations in spray intensity, temperature and composition and feed of powders to the spray which might result in variations of deposition of the coating are spread over all tips 46 of the rotor blades that pass through the spray during the period of variation. This ensures that one rotor blade tip does not receive all of the variation in coating. As a result, a more uniform coating is applied than if a single tip receives the entire variation.

The coating is applied in layers that are approximately parallel to the location of that part of the tip of the rotor blade about the axis. Selecting a fixture 32 which positions the tips at radius from the axis of rotation Ar which is the same as the operative radius in an engine ensures the location of the tip approximates closely the radius in the engine. As a result, the coating is substantially parallel to the axis of rotation of the apparatus and the layer follows approximately the surface of rotation which the coating layer will experience during operation of the engine. It is believed the orientation of the coating will enhance performance of the coating in the engine provided the radius to the tip of the rotor blade in the fixture is substantially equal to the radius to the tip of the rotor blade in the operative environment of the gas turbine engine.

During application of the coating and as the rotor blade passes through the spray, the particles of heated metal strike the tip of the rotor blade and pass the tip of the rotor blade as overspray. Spraying coating particles directly at a non-rotating airfoil tip 46 naturally results in an overspray which accumulates to a small extent on the suction surface 94 and pressure surface 96 at the tip in the gap G. The overspray in some applications is beneficial because it avoids a step change in the coating by providing a smooth transition to the airfoil surface. The overspray coating on these surfaces provides additional cutting surfaces. Rotating the airfoil tip 46 into the spray 16 of coating particles angles one of the surfaces 94,96 of the airfoil tip to the spray as the tip enters the spray to increase the overspray coating on that side of the tip beyond the overspray that naturally occurs for a stationary blade. Rotating the airfoil tip out of the spray of coating particles angles the opposite side of the airfoil to the spray as the tip leaves the spray to increase the overspray coating on that side of the tip. Accordingly, use of the rotatable fixture 32 has the advantage of increasing the volume of cutting material on the suction and pressure surfaces of the airfoil.

The sheet metal shield 98 may aid in avoiding a small step change in the overspray coating. The sheet metal shield 98 extends substantially parallel to the direction toward which the particles are propelled. Particles striking the chamfered surface 162 of the metal shield and glance off the chamfered surface leaving a tapered transition to the side of the airfoil in the gap G between the tip of the airfoil and the shield. In other embodiments, the shield may not end in a chamfer but rather may have a flat surface. The particles striking the substantially flat surface of the airfoil tip impact the tip and may remain in place. A slight lip or step of coating material about the tip of the airfoil may be acceptable for some construction.

At the completion of the spray coating process, the ring member 28 is removed from the tooling assembly. The rotor blade assemblies which include the rotor blade 42, the block 122 and the shield 98 are removed from the fixture 32. The block is slid off the airfoil and over the tip of the rotor blade. The elastic material of the block elastically stretches around the tip of the blade as the block slides over the tip coating without chipping or otherwise injuring the tip coating returns to its original shape with the slot in the block undamaged. The block may be reused, decreasing the cost of supplying the coating to the part.

The metal shield 98 is then slid spanwisely toward the platform into the gap G' that extends between the end of the shield and the platform as shown in FIG. 5A. Sliding the metal shield downwardly separates the metal shield from the light bond that forms at the interface between the chamfered edge of the metal shield and layers of deposited coating. The tabs 112,118 of the metal shield are then opened and the sides 108,114 separated prior to removing the metal shield from the rotor blade. This avoids the hard metal shield from contacting the deposited coating on the tip of the rotor blade and avoids chipping the coating.

The shield 98 may be used time after time simply by opening the tabs 112,118 to remove the shield and bending the tabs back into place to reinstall the shield on a new array of rotor blades. Removal of the shield takes place only after the array of rotor blades completes the entire process: the surface preparation portion of the process using the grit blasting apparatus; and, the coating portion of the process using the coating apparatus.

A particular advantage of the tooling assembly 10 is the use of a single fixture 32 for both the grit blasting and spray coating operations. It avoids handling the blades twice as would occur in fixturing that requires 1) removing the blades and their low temperature shielding from a grit blasting fixture and 2) installing the high temperature shielding and inserting the shielded rotor blade into the coating fixture. This eliminates handling damage and speeds performance of the process.

Another advantage is the quality of the coating. The quality results from distributing the effect of variations in the coating spray, which might result from variations the flow of powder or heating gases to the coating apparatus, over a large number of blades rather than causing such variations to be reflected in the coating that is formed on a single blade. This results from passing the tips through the spray so that each tip 46 is in the plasma spray for a short period of time while receiving an incrementally small coating.

The metal shield 98 is durable and reusable which decreases the cost of masking the parts. In addition, the shield is relatively quick to install and quick to remove in comparison with masking which require the use of an adhesive which must be chemically or mechanically removed from the surface of the airfoil.

Another advantage is the durability of the fixture 32 and the ease at which the fixture is cleaned of any coating material which results from masking the fixture during the grit blasting operation with a resilient mask 48 that protects the surface of the fixture and prevents the surface from being roughened. A roughened surface would promote adhesion of the coating to the surface making it very difficult to clean. The fixture allows easy removal of the elastomeric mask which would not withstand the high temperatures of the coating process. As the coating process is carried out, the wall 36 of the fixture, and the shield 98 insulate the interior of the fixture from the hot gases and from the coating material which enables use of an elastic block while insuring durability of the block for use in subsequent coating operations.

Although the invention has been shown and described with respect to detailed embodiment thereof, it should be understood by those skilled in the art that various changes in form and detail thereof may be made without departing from the spirit and the scope of the claimed invention.

We claim:

1. A tooling assembly for positioning the tips of a plurality of airfoils with respect to an apparatus for propelling a stream of particles at the tip which impact the tip, the tooling assembly having an axis of rotation and having disposed therein a plurality of flow directing assemblies, each having a platform having an outwardly facing surface and an airfoil extending from the platform, the airfoil having a leading edge, a trailing edge, a suction surface and a pressure surface which extend between the edges, and a tip which faces in the outward direction from the assembly, which comprises:

a fixture which extends circumferentially about an axis of rotation, which is rotatable about the axis of rotation under operative conditions of the fixture to move the tips sequentially into the stream and which has a wall which extends axially and circumferentially about the fixture, the wall having a plurality of slots extending through the wall in a generally radial direction each of which is larger than the airfoil leaving a space therebetween and each of which adapts the fixture to receive the airfoil of the flow directing assembly such that the platform is disposed radially inwardly of the wall and the tip of the airfoil is disposed radially outwardly of the wall;

means for positioning the flow directing assembly disposed inwardly of the slot to fix the flow directing assembly within the fixture, said means having at least a portion of the means disposed between said outwardly facing surface of the platform and said wall;

wherein the wall blocks particles from impacting the means for positioning the flow directing assembly and the means and the wall block particles from impacting the outwardly facing surface of the platform of the flow directing assembly.

2. The tooling assembly for positioning the tips of a plurality of airfoils with respect to an apparatus for propelling particles at the tip of the airfoil of claim 1 which has an elastomeric shield which extends circumferentially about the exterior of the fixture, the elastomeric shield having a plurality of slots extending through the shield in a generally radial direction, each slot adapting the elastomeric shield to receive the airfoil of the flow directing assembly such that the tip of the airfoil is disposed radially outwardly from the wall, wherein the apparatus for propelling particles is an abrasive blasting apparatus, and wherein the wall positions the elastomeric shield and the shield blocks particles from impacting the wall.

3. The tooling assembly for positioning the tips of a plurality of airfoils with respect to an apparatus for propelling particles at the tip of the airfoil of claim 1 wherein the means for positioning each flow directing assembly is a block of elastic material at each airfoil, each block being disposed between the platform of an associated flow directing assembly and the wall, the block having a spanwise thickness B and a slot extending through the thickness B which has a profile which adapts the block to receive the cross sectional shape of the airfoil.

4. The tooling assembly for positioning the tips of a plurality of airfoils with respect to an apparatus for propelling particles at the tip of the airfoil of claim 3 wherein a shield having an airfoil shape is disposed about the airfoil and extends for a length of the airfoil not shielded from particles by other structure of the tooling assembly, the shield being disposed between the elastic block and the airfoil such that the block positions the shield and through the shield positions the airfoil and flow directing assembly.

5. The tooling assembly for positioning the tips of a plurality of airfoils with respect to an apparatus for propelling particles at the tip of the airfoil of claim 1 wherein a shield having an airfoil shape is disposed about the airfoil and extends for a length of the airfoil, the length not being shielded from particles by other structure of the tooling assembly.

6. The tooling assembly for positioning the tips of a plurality of airfoils with respect to an apparatus for propelling particles at the tip of the airfoil of claim 2 wherein a shield having an airfoil shape is disposed about the airfoil and extends for a length of the airfoil, the length not being shielded from particles by other structure of the tooling assembly.

7. The tooling assembly for positioning the tips of a plurality of airfoils with respect to an apparatus for propelling particles at the tip of the airfoil of claim 1 wherein the fixture has a base having a circumferentially extending groove adjacent the wall and wherein each block extends into the groove of the base, and wherein the block has a first surface which engages the first surface of the groove, and the block has a first side and a second side, the first side abutting the second side of an adjacent block and the second side abutting the first side of the other adjacent block.

8. The tooling assembly for positioning the tips of a plurality of airfoils with respect to an apparatus for propelling particles at the tip of the airfoil of claim 7 which further includes a ring member which extends circumferentially about the axis of rotation of the fixture, the ring member being spaced axially from the base and engaging the first surface of the wall, the ring member having a surface which is spaced axially a distance Hr from the groove and wherein the block has a second surface which engages the ring and an uninstalled height between the first surface and the second surface of the block which is greater than the height $H_r$ of the ring from the base as measured at the block, and the block is compressed axially by the ring in the installed condition and constrained against movement by the groove as the block is compressed causing the block to exert a circumferential force against the sides of the adjacent blocks and against the surfaces of the base and the wall bounding the groove to fix the plurality of flow directing assemblies in the fixture.

9. The tooling assembly for positioning the tips of a plurality of airfoils with respect to an apparatus for propelling particles at the tip of the airfoil of claim 5 wherein the shield has a front edge, has a first side extending chordwise from the front edge, the first side having a rear edge spaced chordwise from the front edge and a first tab extending from the rear edge at the first end, a second tab extending from the rear edge and spaced spanwise from the first tab leaving a gap $T_a$ therebetween, and a third tab extending from the rear edge which is at the second end and spaced spanwise from the second tab leaving a gap $T_b$ therebetween, and has a second side extending chordwise from the front edge which has a rear edge adjacent to the rear edge of the first side and which has a first tab at a spanwise location aligned with the gap $T_a$ and a second tab aligned with the gap $T_b$; wherein the first and second tabs of the second side extend over the first side and in faying contact with the first side of the shield and the first, second and third tabs of the first side extend over the second side and in faying contact with the second side.

10. A tooling assembly for positioning the tips of a plurality of airfoils with respect to an apparatus for propelling particles at the tip of the airfoil, the tooling assembly having an axis of rotation and having disposed therein a plurality of flow directing assemblies, each having a platform and an airfoil extending from the platform, the airfoil having a leading edge, a trailing edge, a suction surface and a pressure surface which extend between the edges, and a tip which faces in the outward direction from the assembly, which comprises:

a fixture which extends circumferentially about an axis of rotation and which has
- a base extending circumferentially and radially outwardly with respect to the axis of rotation and having a groove which extends circumferentially about the base, the base having an axially facing first surface which extends radially to bound the groove, and a radially outwardly facing second surface which extends axially to bound the groove,
- a wall which extends axially and circumferentially about the fixture, the wall having
  - a first end which is attached to the base, and which has a first surface facing radially inwardly which extends axially and which bounds the groove,
  - a second end which has a circumferentially extending first surface which faces in the axial direction, and
  - a plurality of slots extending through the wall in a generally radial direction each of which adapts the fixture to receive the airfoil of the flow directing assembly such that the platform is disposed radially inwardly of the wall and the tip of the airfoil is disposed radially outwardly of the wall,
- a ring member which extends circumferentially about the axis of rotation of the fixture, the ring member engaging the first surface of the wall and having a surface which is spaced axially a distance Hr from the second surface of the groove;

a plurality of blocks of elastic material, each block being disposed between the platform of an associated flow directing assembly and the wall, the block having a spanwise thickness B and a slot extending through the thickness B which has a profile which adapts the block to receive the cross sectional shape of the airfoil and a shield through which the airfoil extends, the block extending into the groove of the base and the block having a first surface which engages the first surface of the groove and a second surface which engages the second surface of the ring, a first side and a second side, the second side abutting the first side of an adjacent block and the first side abutting the second side of the other adjacent block, a metal shield at each airfoil disposed about the airfoil between the block and the airfoil and extending substantially the entire spanwise length of the airfoil having
- a first end spaced less than a predetermined distance G from the tip,
- a second end spaced less than a predetermined distance G' from the platform, the distance G' being less than the spanwise thickness B of the block, a front edge extending spanwise from the first end to the second end,
- a first side extending chordwise from the front edge, the first side having a rear edge spaced chordwise from the front edge and a first tab extending from the rear edge at the first end, a second tab extending from the rear edge and spaced spanwise from the first tab leaving a gap $T_a$ therebetween, and a third tab extending from the rear edge which is at the second end and spaced spanwise from the second tab leaving a gap $T_b$ therebetween;
- a second side extending chordwise from the front edge which has a rear edge adjacent to the rear edge of the first side and which has a first tab at a spanwise location aligned with the gap $T_a$ and a second tab aligned with the gap $T_b$; wherein the first and second tabs of the second side extend over the first side and in faying contact with the first side of the shield and the first, second and third tabs of the first side extend over the second side and in faying contact with the second side;

wherein the block abuts the shield and exerts a compressive force on the shield to resist spanwise movement of the shield with respect to the airfoil in the uninstalled condition of the rotor blade in the fixture and in the installed condition of the rotor blade in the fixture; and, wherein the block has an uninstalled height Hu between the first surface and second surface which is greater than the height $H_r$ of the ring from the base as measured at the block, and the block is compressed axially by the ring in the installed condition and constrained against movement by the groove as the block is compressed causing the block to exert a circumferential force against the sides of the adjacent blocks and against the surfaces of the base and the wall bounding the groove to fix the plurality of flow directing assemblies in the fixture.

11. The tooling assembly of claim 10 which has an elastomeric shield which extends circumferentially about the exterior of the fixture, the elastomeric shield having a plurality of slots extending through the shield in a generally radial direction, each slot adapting the elastomeric shield to receive the airfoil of the rotor blade such that the tip of the airfoil is disposed radially outwardly from the wall, wherein the apparatus for propelling particles is an abrasive blasting apparatus, and wherein the wall positions the elastomeric shield and the shield blocks particles from impacting the wall.

* * * * *